United States Patent
Owens

(10) Patent No.: US 7,029,588 B2
(45) Date of Patent: Apr. 18, 2006

(54) OXIDIZING SOLUTION AND PROCESS FOR CONTAMINANTS

(76) Inventor: Samuel Rupert Owens, 430 Sheridan Dr., Corpus Christi, TX (US) 78412

( * ) Notice: Subject to any disclaimer, the term of this patent is extended or adjusted under 35 U.S.C. 154(b) by 0 days.

(21) Appl. No.: 10/392,634

(22) Filed: Mar. 19, 2003

(65) Prior Publication Data

US 2004/0182793 A1 Sep. 23, 2004

(51) Int. Cl.
*C02F 1/72* (2006.01)
*C02F 1/76* (2006.01)

(52) U.S. Cl. .................. 210/747; 210/754; 210/759; 210/906; 210/908; 405/128.5

(58) Field of Classification Search ............... 210/747, 210/749, 753, 754, 759, 764, 906, 908; 405/128.5, 405/128.75
See application file for complete search history.

(56) References Cited

U.S. PATENT DOCUMENTS

| | | | |
|---|---|---|---|
| 4,051,058 A | 9/1977 | Bowing et al. | |
| 4,051,059 A | 9/1977 | Bowing et al. | |
| 5,296,239 A | 3/1994 | Colery et al. | |
| 5,472,619 A * | 12/1995 | Holzhauer et al. | 210/721 |
| 5,520,483 A * | 5/1996 | Vigneri | 405/128.45 |
| 5,525,008 A | 6/1996 | Wilson | |
| 5,683,724 A * | 11/1997 | Hei et al. | 424/616 |
| 5,736,057 A * | 4/1998 | Minotti | 210/759 |
| 5,736,497 A | 4/1998 | Steiner | |
| 5,741,427 A * | 4/1998 | Watts et al. | 210/747 |
| 5,820,761 A | 10/1998 | Holzer et al. | |
| 5,948,275 A | 9/1999 | Djafer et al. | |
| 6,036,849 A | 3/2000 | Rippetoe et al. | |
| 6,096,226 A * | 8/2000 | Fuchs et al. | 210/759 |
| 6,245,729 B1 | 6/2001 | Wei et al. | |
| 6,277,414 B1 * | 8/2001 | Elhaik et al. | 424/616 |
| 6,319,888 B1 | 11/2001 | Wei et al. | |
| 6,384,006 B1 | 5/2002 | Wei et al. | |
| 6,387,278 B1 | 5/2002 | Leiff et al. | |
| 6,395,188 B1 | 5/2002 | Burdeniuc et al. | |
| 6,398,938 B1 | 6/2002 | Merk et al. | |
| 6,423,236 B1 | 7/2002 | Shiota et al. | |
| 6,423,868 B1 | 7/2002 | Carr et al. | |
| 6,426,020 B1 | 7/2002 | Okada et al. | |
| 6,453,914 B1 | 9/2002 | Torek et al. | |
| 6,582,611 B1 * | 6/2003 | Kerfoot | 210/747 |
| 2002/0086903 A1 | 7/2002 | Giambrone et al. | |
| 2004/0033923 A1* | 2/2004 | McClung | 510/302 |

FOREIGN PATENT DOCUMENTS

JP 2001048818 A * 2/2001
WO WO 02/12428 A1 * 2/2002

OTHER PUBLICATIONS

US Internet; by Deb Scwhartz; "Oxalic Acid & Oxalates" section; excerpt from ARS Phytochemical Database, 1999.

(Continued)

*Primary Examiner*—Frank Lawrence
(74) *Attorney, Agent, or Firm*—George S. Gray

(57) ABSTRACT

My invention provides an oxidizing solution and process for the in situ oxidation of contaminants, including hydrocarbon, organic, bacterial, phosphonic acid, and other contaminants, the contaminants being found in various surfaces and media, including soil, sludge, and water. In a preferred embodiment, the solution includes a peroxygen compound, such as hydrogen peroxide, in solution with a pre-mixed solution of a carboxylic acid and a halogen salt, such as glycolic acid and sodium bromide, respectively.

70 Claims, 6 Drawing Sheets

OTHER PUBLICATIONS

US Internet; Tianjin Dongfang Chemical Plant; product pages for peracetic acid, 2000.
Lichenstein Internet; Ultralight AG; "UV-Oxidation" section, 2000(e).
US Internet; US Peroxide; "Industrial Pollutant" section, 2002(e)
US Internet; Solvay Interox, INC; "What we do" and "IXPER 60C/75C Calcium Peroxide" sections, 2002.
US Internet; E.I.Dupont De Nemours and Company; "Glycolic Acid Technical Information" section, 1997(e).
US Internet; E.I.Dupont De Nemours and Company; Boiler Cleaning Background Information;38 section, 1999(e).
US Internet; Gauger, et al.; US DOE—Office of Science Education; Student abstract: Waste Management at PNNL, Undated.
US Internet; US Peroxide; "Introduction to Hydrogen Peroxide" section, 2002(e).
US Internet; Koenigsberg, et al.; Environmental Expert, S. L.; "Peroxygen Mediated Bioremediation of MTBE" section, 1999(e).
US Internet; FMC; "Material Safety Data Sheet—PermeOx® Plus" section; Rev. No. 8 Jun. 6, 2002.
US Internet; Linda M. Sweeting; Towson University; "Oxidizing Agents" section, Feb. 1999.
US Internet; DICTIONARY.COM citing Webster's Revised Unabridged Dictionary; "Glycolic Acid", 1998.
UK Inetrnet; Burch, et al.; Executive Summary of "An Investigation of Catalytic Ozonation of Organic Compoundes", Nov. 1996.
DE Internet; Zschimmer & Schwarz Mohsdorf; Burgstadt, Germany; "Phosphonic Acids and Relevant Salts" section, 2002(e).
US Internet; Aptech Group, Inc.; "Cooling Water Solid Concentrates" section, 2002.
US Internet; Conely Company; "Material Safety Data Sheet—Sun® Stain & Scale Inhibitor" section, 2002(e).
US Internet; Biotechnical Resources; "Hansenula as a BioCatalyst" section, 2002(e).

* cited by examiner

OXIDIZING SOLUTION AND PROCESS FOR CONTAMINANTS

BACKGROUND OF THE INVENTION

1. Field of the Invention

The field of the invention is contaminant oxidation, or, more specifically, oxidizing solutions and processes for oxidizing contaminants.

2. Description of Related Art

The appearance of contaminants, such as hydrocarbons, organics, bacteria, algae, animal oils, vegetable oils, and arabic gums, in various media and on various surfaces, creates a need for effective contaminant removal materials and techniques.

For example, a typical surface water storage facility can be expected to encounter hydrocarbon contaminants in tank bottom materials, and in emulsified layers on the stored water. Similarly, cooling tower installations are known to encounter hydrocarbon based oil layers on water that has accumulated in an adjacent basin, as well as, in the sludge at the basin bottom. Algae will frequently appear in the cooling tower to compound the contamination problem. Hydrocarbon contaminants are also known at crude oil storage tanks which frequently have contaminated soil surfaces proximate the tank, and at wastewater treatment plants, which are often faced with hydrocarbon based grease layers at their lift stations, and undesirable bacteria in their aeration tanks.

Organics, including animal oils and vegetable oils, are a known contaminant on surfaces, such as sidewalks and parking lots near restaurants and other public establishments. Sidewalks are also subjected to contamination with arabic gum.

The prior art includes various oxidizing materials, solutions and processes, as well as, various contaminant remediation methods.

U.S. Pat. No. 6,423,868 is a process for the production of an aqueous monoester peroxycarboxylic acid solution by reaction of a peroxygen compound with at least one dicarboxylic acid and with at least one alcohol optionally in the presence of an acid catalyst. Aqueous monoester peroxycarboxylic acid solution is obtainable by this process. Use of the aqueous monoester peroxycarboxylic acid solution is as a disinfectant. A microbicide is described in the description as a monester percarboxylic acid prepared by reaction between a monoester of an aliphatic dicarboxylic acid and hydrogen peroxide.

U.S. Pat. No. 6,423,236 relates to a method for treating waste water including the steps of: oxidizing the waste water, and then treating the oxidized waste water with a reverse osmosis membrane having high salt rejection rate. By being treated with the reverse osmosis membrane, the waste water is separated into an impermeated liquid which contains an oxidizable substance, and a permeated liquid which contains almost no oxidizable substance. Oxidation by hydrogen peroxide is mentioned.

U.S. Pat. Nos. 6,245,729, 6,384,006, and 6,319,888 include a system for forming and releasing an aqueous peracid solution is disclosed. The system includes a container and a peracid forming composition provided within the container. The container is permeable to the passage of water and aqueous peracid solution. The peracid forming composition includes a peracid precursor and a peroxygen source. Preferably, the peracid forming composition includes a chemical heater capable of releasing heat upon hydration. When placed in water, water enters the container and interacts with the peracid forming composition provided within the container. The water combines with the peracid precursor and peroxygen source to provide an aqueous peracid composition. The presence of a chemical heater within the container provides for the generation of heat within the container which enhances the rate of peracid formation. The peracid solution leaves the container and forms an effective sanitizing amount of sanitizer. A composition for forming and releasing an aqueous peracid solution is disclosed. The composition can include a mixture of peracid forming components or a composite structure containing peracid forming components adhered together. Methods of sanitizing a surface having a population of microorganisms are provided, and methods for manufacturing are provided.

U.S. Pat. No. 5,296,239 provides peracetic acid compositions containing at least one thickening agent and optionally a stabilizer chosen from sequestering agents, free-radical scavengers and mixtures containing two or more of these products. The preferred compositions are obtained by successively incorporating at least one stabilizer and then at least one thickening agent. These compositions are especially capable of being employed for the disinfection of large bulks which are difficult to immerse and of nonhorizontal surfaces, and for detergency or bleaching at low temperature.

U.S. Pat. No. 5,736,497 provides a phosphorus-free and boron-free cleaning composition containing a phosphorus-free aqueous solution containing an active ingredient (e.g., hydrogen peroxide or a compound capable of releasing hydrogen peroxide under the conditions prevailing in use of the composition), at least one organic stannate which is a tetravalent tin complexed with dicarboxylic acid, hydroxy carboxylic acid, or tricarboxylic acid, and optionally at least one organic stabilizer which is a benzoate, a sulfonic acid or salt, or mixtures thereof. The active ingredient is hydrogen peroxide or a percarbonate. The aqueous solution has an alkaline pH.

U.S. Pat. No. 4,051,058 provides Stable peroxy-containing concentrates useful for the production of microbicidal agents consisting essentially of 0.5% to 20% by weight of peracetic or perpropionic acid or their precursors, 25% to 40% by weight of $H_2O_2$, 0.25% to 10% by weight of an organic phosphonic acid capable of sequestering bivalent metal cations and their water-soluble acid salts, 0 to 5% by weight of anionic surface-active compounds of the sulfonate and sulfate type, the remainder being water.

U.S. Pat. No. 4,051,059 provides Peroxy-containing concentrates, stable in storage, useful for the production of functional agents consisting essentially of 0.5% to 20% by weight of peracetic or perpropionic acid or their precursors, 25% to 40% by weight of $H_2O_2$ 0 to 5% by weight of anionic surface-active compounds of the sulfonate and sulfate type, the remainder being water.

U.S. Patent Application No. 20020086903 provides synergistic biocidal oxidant, useful as a sanitizer and disinfectant, is disclosed. The synergistic biocidal oxidant comprises a lower organic peracid, preferably peracetic acid, and chlorine dioxide.

U.S. Pat. No. 5,525,008 provides a method and apparatus for in-situ treatment of soil and groundwater contaminated with organic pollutants. The process involves defining the nature and extent of the contamination; determining the hydrology and geology of the contaminated area; determining the volume and concentration of a reactive solution required to effect treatment of the contaminated area; injecting the reactive solution into one or more injectors that are inserted into the ground, sealed and positioned so as to assure flow of the reactive solution through the contaminated area; allowing the reactive solution to flow through the contaminated area thereby reacting chemically with the contaminants contained within the contaminated area; and determining when the treatment is complete by monitoring by-products of the chemical reaction. Preferably, the reactive solution is an aqueous solution of hydrogen peroxide and metallic salts.

U.S. Pat. No. 5,820,761 involves a process wherein organic pollutants in wastewaters are wet-oxidized by addition of pure oxygen or an oxygen-containing gas at temperatures of 80.degrees to 330 degrees C., under pressures of 1 bar to 200 bar and at a pH value below 7. For the wet oxidation process, iron ions and digested sludge or surplus sludge from a biological sewage treatment plant are added to the wastewater.

U.S. Pat. No. 6,387,278 relates to in situ hydrous pyrolysis/partial oxidation of organics at the site of the organics constrained in a subsurface reservoir produces surfactants that can form an oil/water emulsion that is effectively removed from an underground formation. The removal of the oil/water emulsions is particularly useful in several applications, e.g., soil contaminant remediation and enhanced oil recovery operations. A portion of the constrained organics reacts in heated reservoir water with injected steam containing dissolved oxygen gas at ambient reservoir conditions to produce such surfactants.

U.S. Pat. No. 6,036,849 includes a method of removing hydrocarbons from soils contaminated with various hydrocarbons such as gasoline, diesel fuel, solvents, motor oil and crude oil. The process first screens the soil to remove oversized rocks and debris and to reduce the contaminated soil to uniformly sized particles. The soil particles are moved along a conveyor and first sprayed with an oxidizer diluted with ionized water and then sprayed with only ionized water. The washed particles are then vigorously mixed with their entrained oxidizer and ionized water in an auger mixer for several minutes to oxidize almost all of the remaining hydrocarbons. The washed and hydrocarbon-free soil is then moved by conveyor to a stockpile for storage, testing and drying.

U.S. Pat. No. 6,398,938 includes a process, which includes: electrochemically oxidizing at least one organic compound by bringing the organic compound into contact with an anode, wherein the anode includes: an electrically conductive support; and an electrically conductive, anodically polarized layer on the support; wherein the anodically polarized layer is formed in situ upon the support by precoating; and wherein the organic compound is not phosphonomethyliminodiacetic acid. Another embodiment of the present invention provides a product, produced by the above process.

U.S. Pat. No. 5,948,275 is an integrated method for purifying industrial and/or urban effluents containing a large amount of organic material in solution and/or suspension, wherein said effluents are treated in a wet oxidation reactor. The effluents are oxidized in the presence of at least one oxidizing gas to mineralize a large part of the organic material therein by producing a gas phase and an essentially liquid phase mainly containing soluble residual organic material, as well as an essentially inorganic solid phase in suspension. The essentially liquid phase from the reactor is subjected to liquid/solid separation to separate the solid phase, and at least a fraction of the separated solid phase is recycled in the wet oxidation reactor. Various alternative embodiments of the method include adding a catalyst and/or an agent for acidifying the recycled solid phase fraction. The facility may operate continuously or semi-continuously between interruptions.

U.S. Pat. No. 6,453,914 includes a method for removing organometallic and organosilicate residues remaining after a dry etch process from semiconductor substrates. The substrate is exposed to a conditioning solution of phosphoric acid, hydrofluoric acid, and a carboxylic acid, such as acetic acid, which removes the remaining dry etch residues while minimizing removal of material from desired substrate features. The approximate proportions of the conditioning solution are typically 80 to 95 percent acetic acid, 1 to 15 percent phosphoric acid, and 0.01 to 5.0 percent hydrofluoric acid.

U.S. Pat. No. 6,395,188 is a single step wet oxidation process for treating wastewaters containing organic species, with or without heteroatoms, and anions of strong acids, e.g. sulfate or phosphate ion, or cations of strong bases, e.g., sodium, potassium or calcium ions, and which may contain ammonium ion and/or nitrate ion in addition to added ammonium ion and/or nitrate ion was developed which on thermal treatment near the critical temperature of water removes substantially all the COD and nitrogen through conversion to water, carbon dioxide or carbonate species, nitrogen gas and small amounts of nitrous oxide. Key to the success of the process is the balancing of all reducing species with an equivalent amount of oxidizing species and the balancing of all strong acid anions with strong base cations and including at least 0.06 acetate ion for moles of nitrate in the wet oxidation process.

U.S. Pat. No. 6,426,020 is an etchant for copper or copper alloys comprising 5–50 wt % of an alkanolamine, a copper ion source in the amount of 0.2–10 wt % as copper, a halide ion source in the amount of 0.005–10 wt % as halogen, 0.1–30 wt % of an aliphatic carboxylic acid, and the balance water, wherein the molar ratio of the alkanolamine to one mol of the aliphatic carboxylic acid is two or more. The etchant is free from problems such as instability of the liquid composition and unpleasant odor, has a high etching rate, exhibits only very slight corrosion even if a small amount of residue is left on the surface and is capable of producing a roughened surface when used for microetching.

While the foregoing may function generally with respect to the purposes for which they were designed, they would not be as suitable for the purposes of the present invention, as hereinafter described. For example, such compositions and processes do not provide what is needed, that is effective oxidizing solutions and processes for safely oxidizing the above-described contaminants in a wide variety of locations and media in which they are encountered.

SUMMARY OF THE INVENTION

The present invention overcomes the shortcomings of the prior art by providing oxidizing solutions and processes for safely removing hydrocarbon and other contaminants from a wide variety of media and surfaces.

I have provided an oxidizing solution, comprising an aqueous solution comprising a peroxygen compound and a carboxylic acid selected from the group consisting of glycolic acid, oxalic acid, formic acid, and benzoic acid. In some embodiments, peroxygen compound is selected from the group consisting of hydrogen peroxide, calcium peroxide, magnesium peroxide, and sodium perborate and the solution further comprises a halogen compound selected from the group consisting of sodium bromide, sodium chloride, sodium fluoride, sodium iodide, and periodic acid.

In one embodiment, the peroxygen compound is hydrogen peroxide, the carboxylic acid is glycolic acid, and the halogen compound is sodium bromide, and sodium percarbonate is the source of the hydrogen peroxide. In another embodiment, the peroxygen compound is hydrogen peroxide, the carboxylic acid is glycolic acid, and the halogen compound is sodium iodide.

My invention provides a process for oxidizing hydrocarbon contaminants in a media comprising exposing the hydrocarbon contaminants to an aqueous solution comprising a peroxygen compound and a carboxylic acid. The process is applicable when the media is selected from a group consisting of soil, sludge, and water. In some embodiments, the aqueous solution further comprises a halogen compound, and in some the halogen compound is selected from the group consisting of sodium bromide, sodium chloride, sodium fluoride, sodium iodide, and periodic acid. In some embodiments, the peroxygen compound is hydrogen peroxide, the carboxylic acid is glycolic acid, and the halogen compound is sodium bromide. In some embodiments, the media is water and the hydrocarbon contaminant is approximately 1 percent by weight, the hydrogen peroxide is from approximately 3 to 30 percent by weight, the glycolic acid is from approximately 0.0001 to 10 percent by weight, and the sodium bromide is from approximately 0.00005 to 10 percent by weight, and sodium percarbonate can be the source of the hydrogen peroxide. In some embodiments, the carboxylic acid is selected from the group consisting of glycolic acid, oxalic acid, acetic acid, formic acid, and benzoic acid, and in some embodiments the peroxygen compound is selected from the group consisting of hydrogen peroxide, calcium peroxide, magnesium peroxide, and sodium perborate. In other embodiments, exposing the hydrocarbon contaminants to an aqueous solution further comprises exposing the hydrocarbon contaminants to the aqueous solution by mixing the aqueous solution with the media.

I have provided a process for oxidizing hydrocarbon contaminants in a media comprising: exposing at least some of the hydrocarbon contaminants to a peroxygen compound; and exposing the remaining hydrocarbon contaminants to an aqueous solution comprising a carboxylic acid. In some embodiments, the media is selected from a group consisting of soil, sludge, and water. In some embodiments, the aqueous solution further comprises a halogen compound, and in some, the halogen compound is selected from the group consisting of sodium bromide, sodium chloride, sodium fluoride, sodium iodide, and periodic acid. In additional embodiments, the peroxygen compound is hydrogen peroxide, the carboxylic acid is glycolic acid, and the halogen compound is sodium bromide, the media is water and the hydrocarbon contaminant is approximately 1 percent by weight, the hydrogen peroxide is from approximately 3 to 30 percent by weight, the glycolic acid is from approximately 0.0001 to 10 percent by weight, and the sodium bromide is from approximately 0.00005 to 10 percent by weight. In some embodiments, sodium percarbonate is the source of the hydrogen peroxide, and in some the peroxygen compound is hydrogen peroxide, the carboxylic acid is glycolic acid, and the halogen compound is sodium iodide. In additional embodiments, the carboxylic acid is selected from the group consisting of glycolic acid, oxalic acid, acetic acid, formic acid, and benzoic acid. In some embodiments, the peroxygen compound is selected from the group consisting of hydrogen peroxide, calcium peroxide, magnesium peroxide, and sodium perborate. In additional embodiments, the step of exposing at least some of the hydrocarbon contaminants to a peroxygen compound, further comprises exposing at least some of the hydrocarbon contaminants to the peroxygen compound by mixing the peroxygen compound with the media; and the step of exposing the remaining hydrocarbon contaminants to a carboxylic acid, further comprises exposing the remaining hydrocarbon contaminants to a carboxylic acid by mixing the carboxylic acid with the media.

My invention provides a process for oxidizing phosphonic acid contaminants in a media comprising: exposing at least some of the phosphonic acid contaminants to a peroxygen compound; and exposing the remaining phosphonic acid contaminants to an aqueous solution comprising a carboxylic acid. In some embodiments, the media is selected from a group consisting of soil, sludge, and water. In another embodiment, the aqueous solution further comprises a halogen compound, and in some embodiments, the halogen compound is selected from the group consisting of sodium bromide, sodium chloride, sodium fluoride, sodium iodide, and periodic acid. In additional embodiments, the peroxygen compound is hydrogen peroxide, the carboxylic acid is glycolic acid, and the halogen compound is sodium bromide, and in some embodiments, sodium percarbonate is the source of the hydrogen peroxide. In some embodiments, the peroxygen compound is hydrogen peroxide, the carboxylic acid is glycolic acid, and the halogen compound is sodium iodide, and in some, the carboxylic acid is selected from the group consisting of glycolic acid, oxalic acid, acetic acid, formic acid, and benzoic acid, and the peroxygen compound is selected from the group consisting of hydrogen peroxide, calcium peroxide, magnesium peroxide, and sodium perborate. In additional embodiments, the step of exposing at least some of the phosphonic acid contaminants to a peroxygen compound, further comprises exposing at least some of the phosphonic acid contaminants to the peroxygen compound by mixing the peroxygen compound with the media; and the step of exposing the remaining phosphonic acid contaminants to a carboxylic acid, further comprises exposing the remaining phosphonic acid contaminants to a carboxylic acid by mixing the carboxylic acid with the media.

I have provided a process for oxidizing contaminants on a solid surface, wherein the solid surface is selected from the group consisting of brick, concrete, cement, asphalt, clay, and caliche, the process comprising: wetting the solid surface with water; distributing a peroxygen compound onto the surface; and distributing an aqueous carboxylic acid solution onto the surface. In some embodiments, the contaminant is selected from the group consisting of arabic gum, hydrocarbon, animal oil, and vegetable oil. In additional embodiments, the aqueous carboxylic acid solution further comprises a halogen compound, and in some embodiments, the peroxygen compound is hydrogen peroxide, the carboxylic acid is glycolic acid, and the halogen compound is sodium bromide. In some embodiments, sodium percarbonate is the source of the hydrogen peroxide.

My invention provides a process for oxidizing organic compound contaminants in a media, wherein the organic compound is selected from the group consisting of animal oils and vegetable oils, the process comprising: exposing at least some of the organic compound contaminants to a peroxygen compound; and exposing the remaining organic compound contaminants to an aqueous solution comprising a carboxylic acid. In some embodiments, the media is selected from a group consisting of soil, sludge, and water. In additional embodiments, the aqueous solution further comprises a halogen compound, and in some embodiments, the halogen compound is selected from the group consisting of sodium bromide, sodium chloride, sodium fluoride, sodium iodide, and periodic acid. In some embodiments, the peroxygen compound is hydrogen peroxide, the carboxylic acid is glycolic acid, and the halogen compound is sodium bromide, and in some embodiments, sodium percarbonate is the source of the hydrogen peroxide. In additional embodiments, the peroxygen compound is hydrogen peroxide, the carboxylic acid is glycolic acid, and the halogen compound is sodium iodide, and in some embodiments, the carboxylic acid is selected from the group consisting of glycolic acid, oxalic acid, acetic acid, formic acid, and benzoic acid. In some embodiments, the peroxygen compound is selected from the group consisting of hydrogen peroxide, calcium peroxide, magnesium peroxide, and sodium perborate.

A process for oxidizing contaminated sludge underlying water is provided, comprising: distributing a peroxygen compound into the water; and distributing a carboxylic acid into the water. In some embodiments, the step of distributing a carboxylic acid into the water further comprises distributing a solution into the water having the carboxylic acid and a halogen compound. In additional embodiments, the peroxygen compound is hydrogen peroxide, the carboxylic acid is glycolic acid, and the halogen compound is sodium bromide.

My invention provides a process for oxidizing bacteria suspended in wastewater, comprising: exposing at least some of the bacteria to a peroxygen compound by mixing the peroxygen compound with the wastewater; and exposing the remaining bacteria to an aqueous solution comprising a carboxylic acid by mixing the aqueous solution with the wastewater. In some embodiments, the aqueous solution further comprises a halogen compound, and in some embodiments, the halogen compound is selected from the group consisting of sodium bromide, sodium chloride, sodium fluoride, sodium iodide, and periodic acid. In another embodiment, the peroxygen compound is hydrogen peroxide, the carboxylic acid is glycolic acid, and the halogen compound is sodium bromide, and in some embodiments, sodium percarbonate is the source of the hydrogen peroxide. In additional embodiments, the peroxygen compound is hydrogen peroxide, the carboxylic acid is glycolic acid, and the halogen compound is sodium iodide, and in some embodiments, the carboxylic acid is selected from the group consisting of glycolic acid, oxalic acid, acetic acid, formic acid, and benzoic acid. In some embodiments, the peroxygen compound is selected from the group consisting of hydrogen peroxide, calcium peroxide, magnesium peroxide, and sodium perborate.

I have provided a process for oxidizing hydrocarbon contaminants in a subsurface formation, wherein the subsurface formation is in communication with the surface through a well bore, comprising: exposing the hydrocarbon contaminants to an aqueous solution comprising a peroxygen compound and a carboxylic acid, by injecting the solution through the well bore to the subsurface formation. In some embodiments, the aqueous solution further comprises a halogen compound, and in some embodiments, the peroxygen compound is hydrogen peroxide, the carboxylic acid is glycolic acid, and the halogen compound is sodium bromide.

My invention provides an oxidizing solution, comprising an aqueous solution comprising a peroxygen compound, a carboxylic acid, and a halogen compound. In some embodiments, the peroxygen compound is hydrogen peroxide, the carboxylic acid is glycolic acid, and the halogen compound is sodium bromide.

The foregoing features and advantages of my invention will be apparent from the following more particular descriptions of exemplary embodiments of the invention as illustrated, in some embodiments, in the accompanying drawings.

DETAILED DESCRIPTION OF EXEMPLARY EMBODIMENTS

The following discussion describes in detail exemplary embodiments of the invention. This discussion should not be construed, however, as limiting the invention to those particular embodiments. Practitioners skilled in the art will recognize numerous other embodiments as well. For a definition of the complete scope of the invention, the reader is directed to the appended claims.

As used herein, the term "hydrocarbons" means hydrocarbons or halogenated, particularly chlorinated, organic solvents such as trichloroethane (TCA), trichloroethylene (TCE), perchloroethylene (PCE), dichloroethane (DCA) or dichloroethylene (DCE), etc., and include herbicides, insecticides, and fuel hydrocarbons such as those hydrocarbons commonly found in gasoline, diesel fuel, solvents, motor oil, crude oil, aviation fuel, and the like.

Exemplary embodiments of contaminant oxidizing solutions and contaminant oxidation processes of the present invention are illustrated by the examples listed below. In some such examples, the contaminant oxidizing solution is formed in the contaminated media.

EXAMPLE 1

Figure 1:
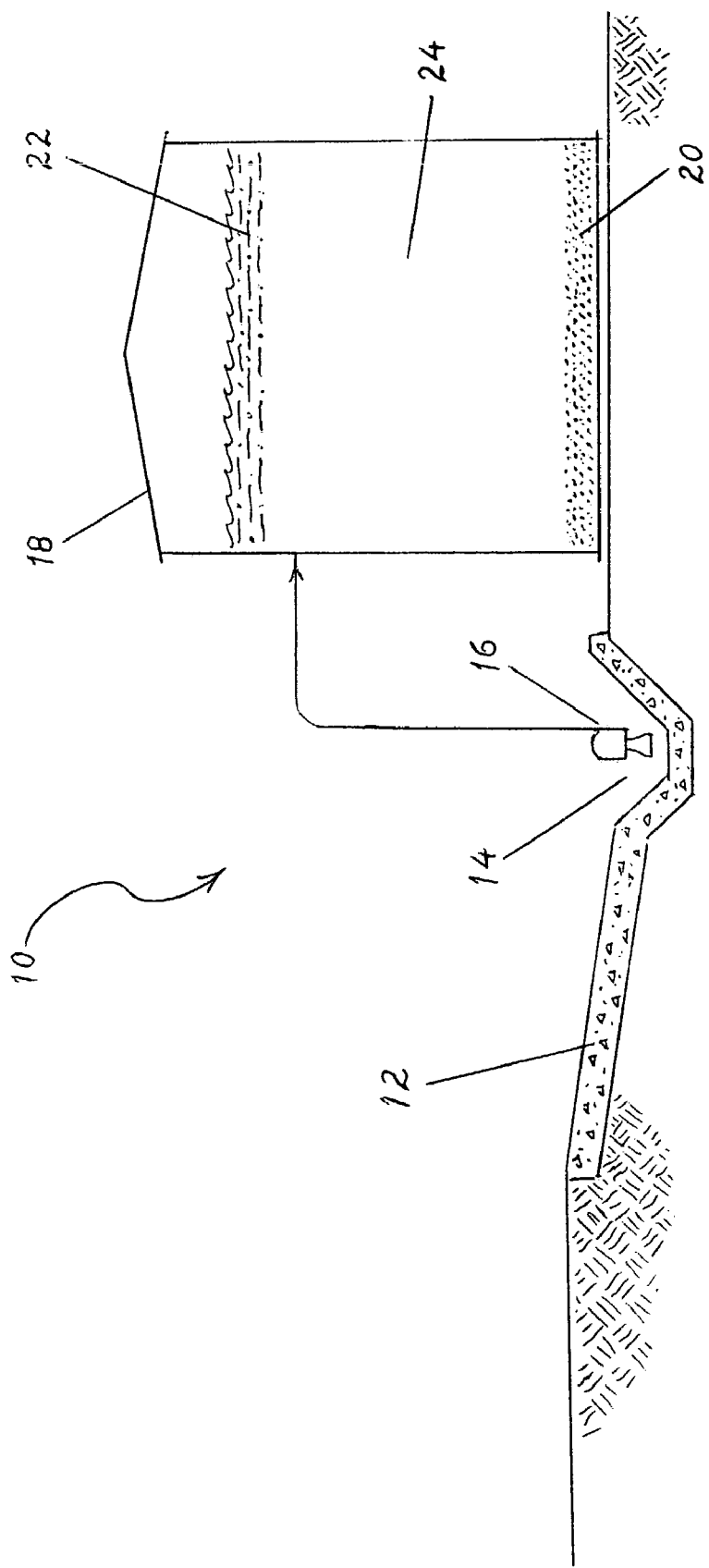
FIG. 1 is a schematic, partially sectional view of a surface water storage facility.

An exemplary embodiment of a solution and process of the present invention is illustrated by a first example with respect to the surface water storage facility 10 shown in schematic section in FIG. 1. Storm water and washdown water from a remote pumping station and tank truck unloading facility had drained along a slope 12 to trench 14, where a pump 16 lifted the contaminated water into a storage tank 18. Over time a sludge 20, containing clay, sand, and inorganic particulate matter, and contaminated with hydrocarbons, formed on the tank bottom, and a hydrocarbon-based emulsified oil layer 22 formed on the water 24. A 500 milliliter sample of the emulsified oil layer 22 and a 500 milliliter sample of the sludge 20 were acquired.

In this first example, the emulsified oil layer 22 sample was exposed to approximately 453 grams (1 pound) of sodium carbonate peroxyhydrate (a/k/a sodium carbonate peroxohydrate and hereinafter referred to as sodium percarbonate), resulting in the placement in the sample of a peroxygen compound, i.e. hydrogen peroxide. After approximately five minutes, the emulsified oil layer was exposed to 50 milliliters of an aqueous solution including a carboxylic acid, i.e. glycolic acid, and a halogen salt, i.e. sodium bromide. This aqueous solution, prior to exposure was approximately 14.3 percent glycolic acid by weight and approximately 11.3 percent sodium bromide by weight. After introduction of the aqueous solution into the sample, the solution was approximately 5 percent glycolic acid and 4 percent sodium bromide. After 12 minutes the sample appeared to be clear water with only a trace of an oil slick on top of the water 24. Prospectively, it is anticipated that the remaining trace would be oxidized by a repetition of the foregoing exposures and/or increased treatment amounts. It is estimated that the sodium percarbonate and the aqueous solution combined to form a solution having a pH of approximately 5.0.

The 500 milliliter sample of the sludge 20 was exposed to approximately 226 grams (0.5 pounds) of sodium percarbonate by stirring the latter into the sample. The sample was then exposed to an aqueous solution containing glycolic acid and sodium bromide in water, by stirring 250 milliliters of the aqueous solution into the sample. The stirring totaled between six and seven minutes, with the sodium percarbonate being stirred in less than two minutes before the aqueous solution was added. This aqueous solution was approximately 14.3 percent glycolic acid by weight and approximately 11.3 percent sodium bromide by weight. The sludge changed color from black to reddish-brown, and all apparent hydrocarbon that acted as a sediment binder was removed, leaving a free flowing sand-like material. It is estimated that the sodium percarbonate and the aqueous solution combined to form a solution having a pH of approximately 6.0.

In a prospective example, the hydrocarbon contaminated sludge is mixed, by stirring, with a pre-mixed solution comprising the foregoing sodium percarbonate and the aqueous solution containing glycolic acid and sodium bromide.

EXAMPLE 2

Figure 2:
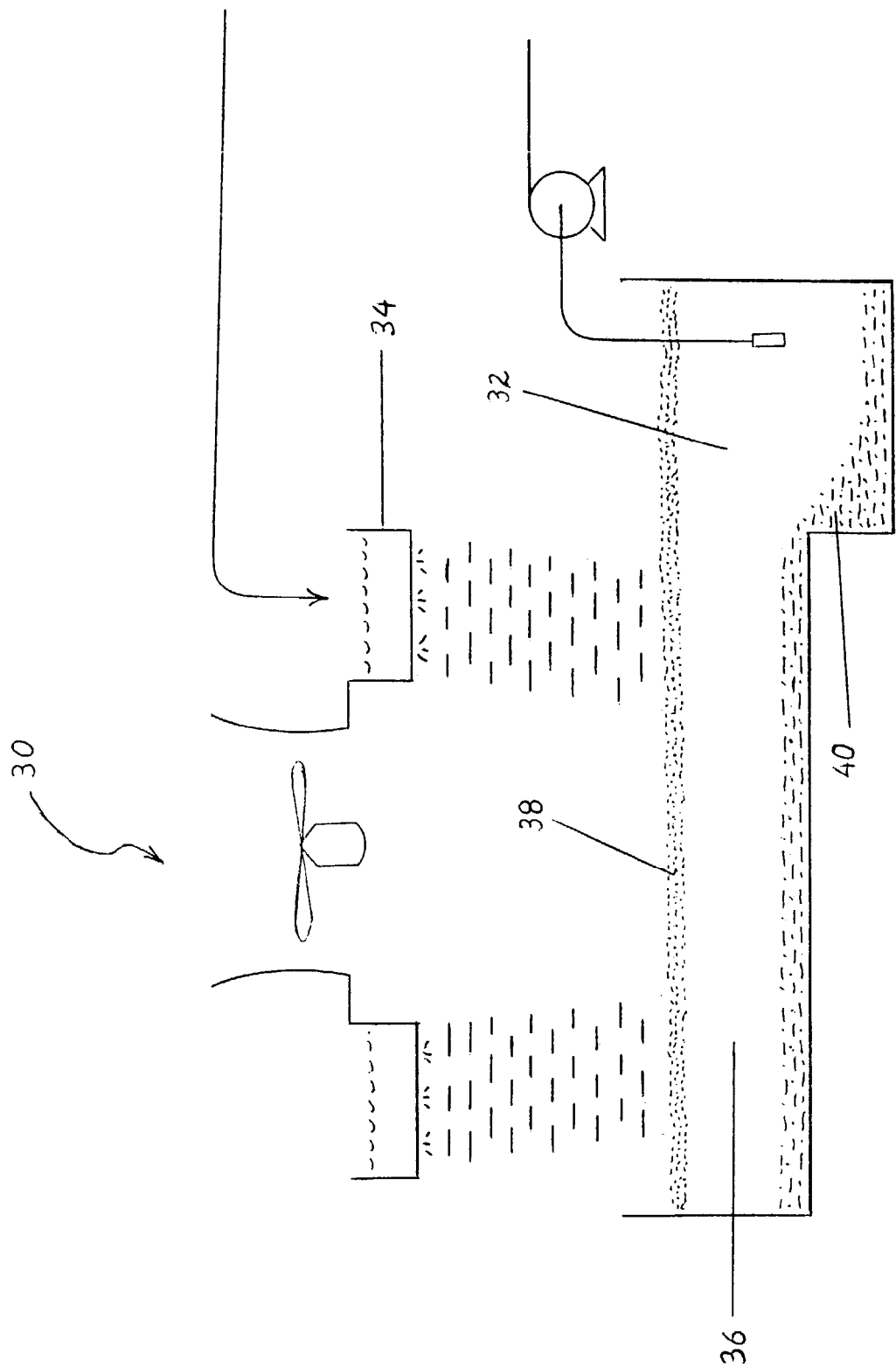
FIG. 2 is a schematic, partially sectional view of a cooling tower installation.

An exemplary embodiment of a solution and process of the present invention is illustrated by a second example with respect to the cooling tower installation 30 shown in schematic section in FIG. 2. In this type of installation, the water 32 is aerated as it descends through the cooling tower 34, and then accumulates in a basin 36. In this example, a hydrocarbon-based oil layer 38 was present on top of the water and a thick, odorous, and slimy sludge layer 40, six to eight inches deep, was on the bottom of the basin. An estimated 1.8 kilograms (4 pounds) of a hydrocarbon based oil and 56.7 kilograms (125 pounds) of an organic material were present in the sludge layer. Approximately 25,700 liters (6,800 gallons) of water was present in the basin.

In this second example, the oil layer 38 was exposed to approximately 45 kilograms (100 pounds) of sodium percarbonate by pouring the same into the water 32 having the oil layer 38. This resulted in the placement in the water of a peroxygen compound, i.e. hydrogen peroxide. After approximately fifteen minutes, the oil layer was exposed to an aqueous solution including a carboxylic acid, i.e. glycolic acid, and a halogen salt, i.e. sodium bromide, the combined volume of the aqueous solution being approximately 38 liters (10 gallons). This aqueous solution was approximately 14.3 percent glycolic acid by weight and approximately 11.3 percent sodium bromide by weight. It is estimated that the sodium percarbonate and the aqueous solution combined to form a solution having a pH of approximately 8.0.

Within 30 minutes the oil layer 38 was removed by oxidation. In the area where the aqueous solution was introduced into the water 32, the contaminants were removed from the sludge layer 40 leaving a 3.8 cm (1.5 inch layer of sand and clay).

To finish removing the remaining sludge layer 40, the amounts of sodium percarbonate, glycolic acid and sodium bromide were doubled and the sodium percarbonate and the aqueous solution were distributed more uniformly over the surface area of the water in the basin 36. The sodium percarbonate was distributed into the water less than two minutes before the aqueous solution. The entire remaining sludge layer was reduced to 1.3 cm. to 5.1 cm. (0.5 to 2.0 inches) of clay, sand and a firm mud material. The previous odor was removed and no odor or fumes were evident from the treatment. Algae growing in the cooling tower 34 were also removed, after treated water was circulated through the system. Prospectively, it is anticipated that an adjustment of the volumes of the sodium percarbonate and the aqueous solution, along with a broader distribution of sodium percarbonate and the aqueous solution into the water overlying the sludge layer, will successfully remove the contaminants from the sludge layer, with no repeated distributions.

EXAMPLE 3

Figure 3:
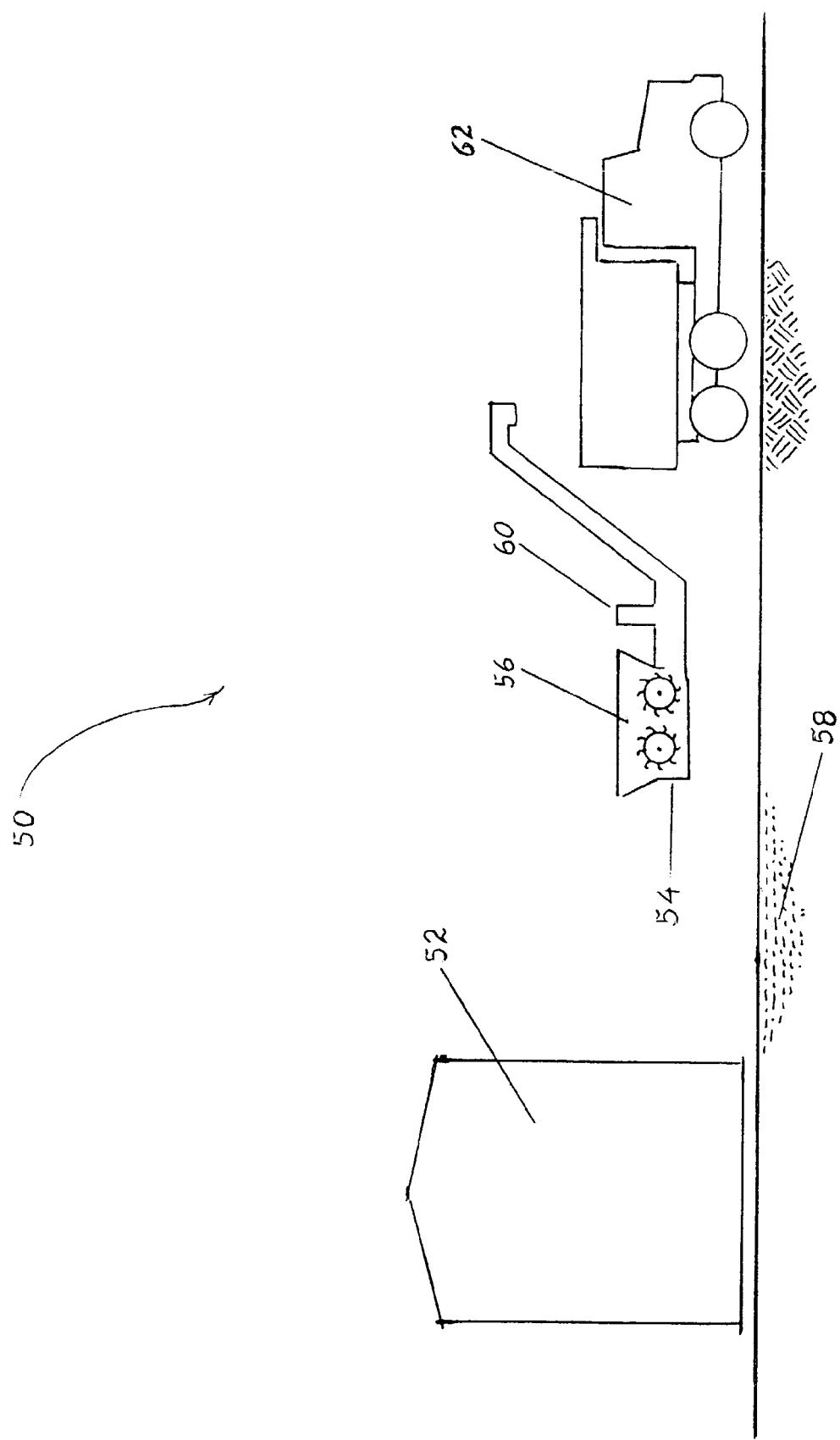
FIG. 3 is a schematic, partially sectional view of a crude oil storage tank installation.

An exemplary embodiment of a solution and process of the present invention is illustrated by a third example with respect to the crude oil storage tank facility 50 shown in schematic section in FIG. 3, having a crude oil storage tank 52, along with a mixing machine 54 having a hopper 56 for the reception of the crude oil contaminated soil 58 and a chemical injection port 60 for introducing chemicals to the soil while the soil is being agitated by the machine 54, prior to being discharged into a truck 62 for hauling.

In this third example, approximately 0.765 cubic meters (1 cubic yard) of the contaminated soil 58 was placed in the mixing machine 54 and exposed to sodium percarbonate, resulting in the placement of a peroxygen compound, i.e. hydrogen peroxide in the contaminated soil. The sodium percarbonate was added through the hopper 56. Within two minutes, the contaminated soil was exposed to an aqueous solution including a carboxylic acid, i.e. glycolic acid, and a halogen salt, i.e. sodium bromide, by introducing the aqueous solution through the chemical injection port 60 such that the aqueous solution combined with the hydrogen peroxide. This aqueous solution was approximately 14.3 percent glycolic acid by weight and approximately 11.3 percent sodium bromide by weight. During treatment, it is estimated that the sodium percarbonate and the aqueous solution combined to form a solution having a pH of approximately 7.5.

Although amounts of the sodium percarbonate and the aqueous solution were not measured accurately, the contaminated soil 58 was cleaned of the crude oil contaminants, and lost the oil odor previously present on the soil.

EXAMPLE 4

Figure 4:
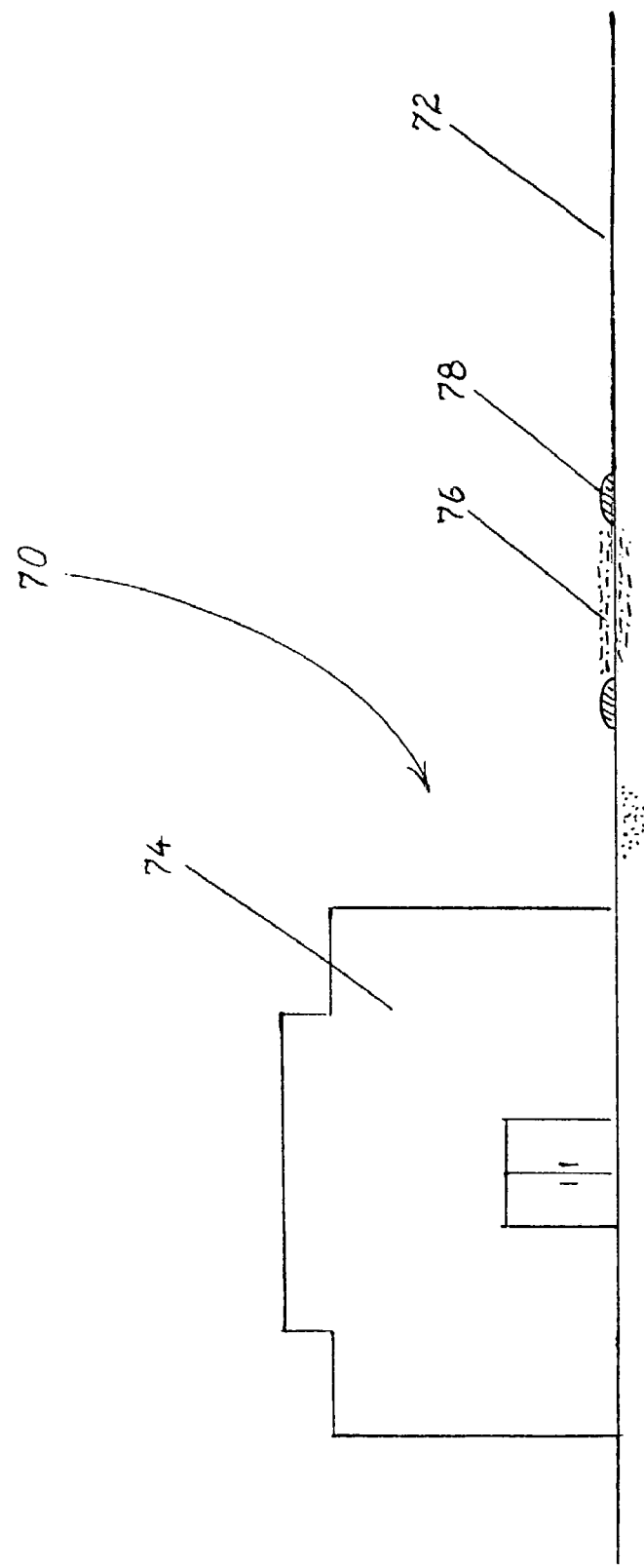
FIG. 4 is a schematic, partially sectional view of a restaurant facility and adjacent parking lot.

An exemplary embodiment of a solution and process of the present invention is illustrated by a fourth example with respect to the public facility 70 shown in schematic section in FIG. 4, having a solid cement surfaced parking lot 72 near the building 74. The cement surface 72 was contaminated with an organic compound, i.e. vegetable oil 76 from a spilled cooking container, but contained by a boundary 78 made of an absorbent material. Approximately 0.95 liters (0.25 gallons) of oil was in the spill area.

In this fourth example, approximately 38 liters (10 gallons) of water was sprayed on the oil 76. 1.8 kilograms (4 pounds) of sodium percarbonate were then added to the sprayed water on the oil, resulting in the placement of a peroxygen compound, i.e. hydrogen peroxide on the oil. Within approximately two minutes, the oil was exposed to an aqueous solution including a carboxylic acid, i.e. glycolic acid, and a halogen salt, i.e. sodium bromide. This aqueous solution was approximately 14.3 percent glycolic acid by weight and approximately 11.3 percent sodium bromide by weight. During treatment, the sodium percarbonate and the aqueous solution combined to form a solution having a pH of approximately 4.0.

In this fourth example, the oil 76 was completely oxidized within ten minutes and the cement was as clean as new cement. Oil on the edge of the absorbent material was also removed.

EXAMPLE 5

Figure 5:
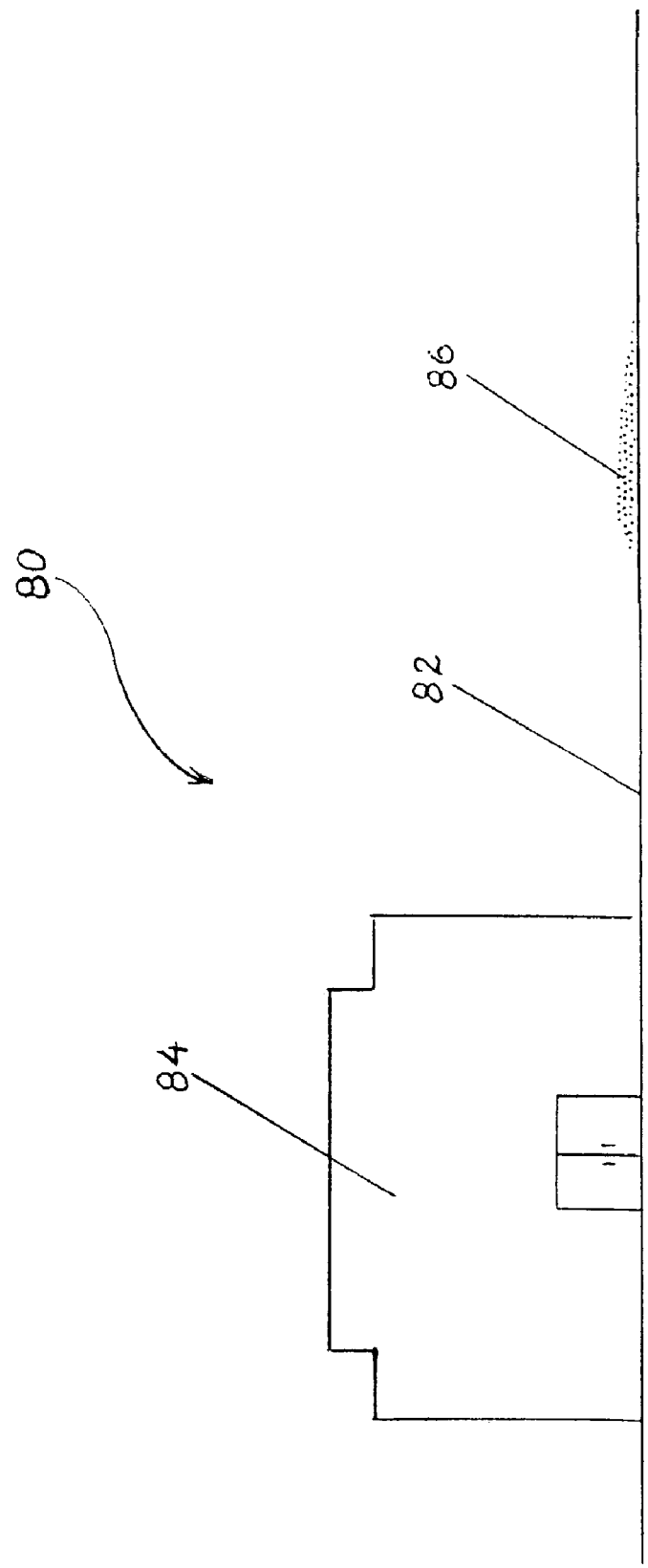
FIG. 5 is a schematic, partially sectional view of a theater and adjacent sidewalk.

An exemplary embodiment of a solution and process of the present invention is illustrated by a fifth example with respect to a public theater facility 80 shown in schematic section in FIG. 5, having a solid concrete surface sidewalk 82 near a theater building 84. The concrete surface 82 was contaminated with an arabic gum compound, i.e. chewing gum 86 over an approximately 3 square meters (32 square feet).

In this fifth example, water was sprayed on the contaminated area until it was dampened. Then 453 grams (1 pound) of sodium percarbonate was sprinkled onto the contaminated area, resulting in the placement of a peroxygen compound, i.e. hydrogen peroxide on the contaminated area. After approximately 20 minutes, the gum was exposed to an aqueous solution including a carboxylic acid, i.e. glycolic acid, and a halogen salt, i.e. sodium bromide by spraying the aqueous solution on the contaminated area. This aqueous solution was approximately 14.3 percent glycolic acid by weight and approximately 11.3 percent sodium bromide by weight. Additional water spray was then used to keep the area wet for approximately 20 minutes. During treatment, it is estimated that the sodium percarbonate and the aqueous solution combined to form a solution having a pH of approximately 7.0.

In this fifth example, after approximately 45 minutes, residue from the oxidized gum broke up in small hard fragments that were easily removed from the concrete surface by sweeping.

EXAMPLE 6

Figure 6:
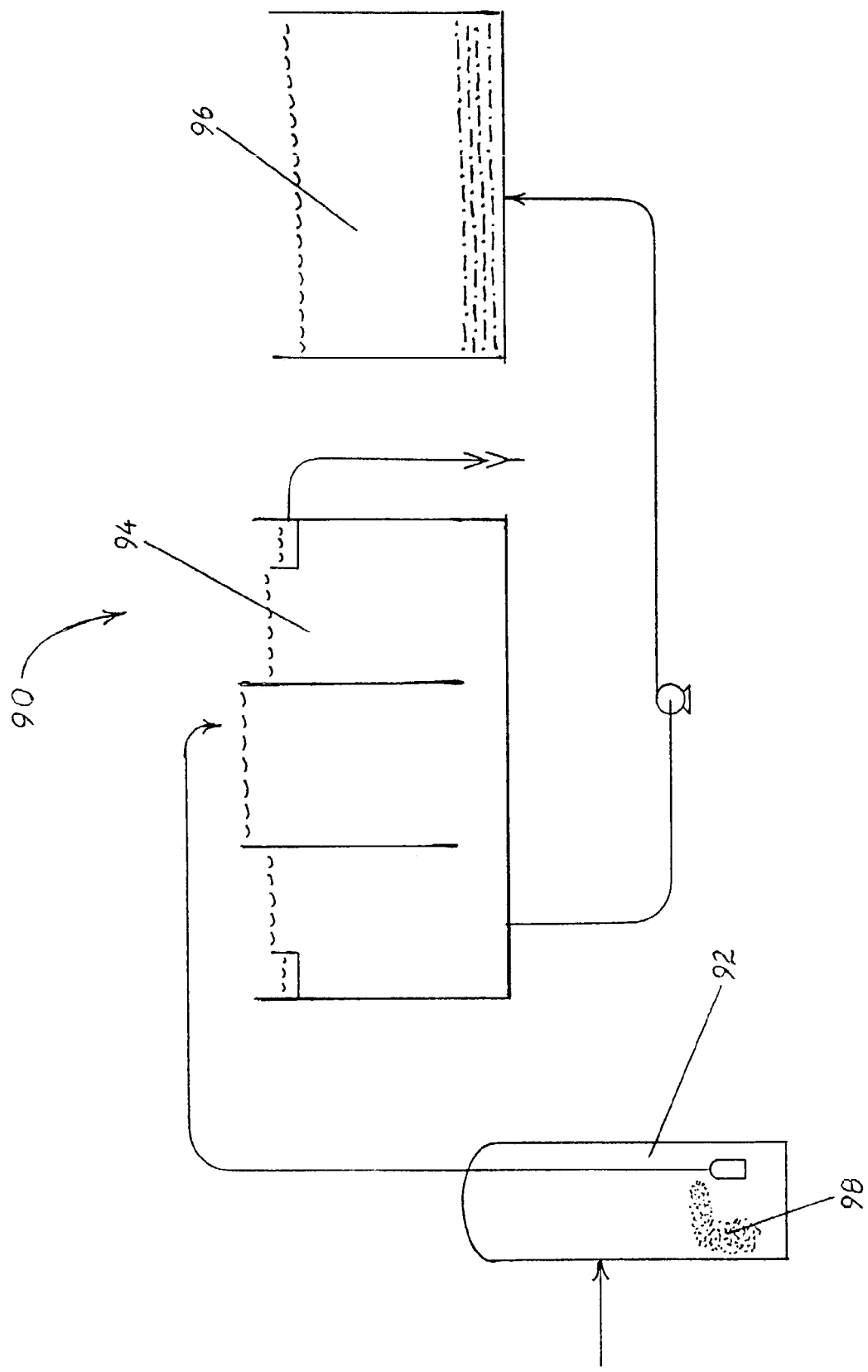
FIG. 6 is a schematic, partially sectional view of a wastewater treatment plant.

An exemplary embodiment of a solution and process of the present invention is illustrated by a sixth example with respect to the wastewater treatment plant 90 shown in schematic section in FIG. 6, having a lift station 92, clarifier 94, and sludge aeration tank 96. The lift station had a 76 centimeter (2.5 foot) grease layer 98 floating on and in the wastewater. The grease layer was hydrocarbon based. Filamentous bacteria in the aeration tank 96 were causing excessive foaming and plant effluent was out of specification with respect to ammonia and total suspended solids. The plant had an average dissolved oxygen content of 0.8 ppm.

In this sixth example, the grease layer 98 was exposed to approximately 272 kilograms (600 pounds) of sodium percarbonate resulting in the placement of a peroxygen compound, i.e. hydrogen peroxide in the contaminated water. The amount of sodium percarbonate equated to a 1:1 ratio of the same to the grease layer by weight. Within approximately two minutes, the grease layer was exposed to an aqueous solution including a carboxylic acid, i.e. glycolic acid, and a halogen salt, i.e. sodium bromide, by adding 7.6 liters (2 gallons) of the solution to the contaminated water. The amount of the aqueous solution equated to a 1:2 ratio of the same to the grease layer by weight. This aqueous solution was approximately 14.3 percent glycolic acid by weight and approximately 11.3 percent sodium bromide by weight. During treatment, it is estimated that the sodium percarbonate and the aqueous solution combined to form a solution having a pH of approximately 8.0.

After approximately two hours, the filamentous bacteria in the aeration tank was no longer evident, the plant average dissolved oxygen content rose to 14 ppm, oxidation of the grease in the lift station was visually observed, and the plant was adequately digesting both solids and ammonia. Foaming was under control and the plant aeration could be increased. The plant effluent was improved to good quality.

EXAMPLE 7

An exemplary embodiment of a solution and process of the present invention is illustrated by a seventh example where, in the laboratory, an aqueous solution containing 10 percent by weight isopropyl alcohol was first treated by adding a peroxygen, i.e. hydrogen peroxide such that the resulting solution was 15 percent by weight hydrogen peroxide. A pre-mixed combination of a halogen salt, i.e. sodium bromide with a carboxylic acid, i.e. glycolic acid, was then added such that the resulting solution was 1 percent by weight sodium bromide and 4 percent by weight glycolic acid. The isopropyl alcohol was fully and almost instantaneously oxidized after the pre-mixed sodium bromide and glycolic acid were added.

EXAMPLE 8

An exemplary embodiment of a solution and process of the present invention is illustrated by an eighth example where, in the laboratory, an aqueous solution containing 10 percent by weight isopropyl alcohol was first treated by adding a peroxygen, i.e. hydrogen peroxide such that the resulting solution was 15 percent by weight hydrogen peroxide. A carboxylic acid, i.e. glycolic acid, was then added such that the resulting solution was 2 percent by weight glycolic acid. The isopropyl alcohol was fully oxidized after the glycolic acid was added. The oxidation was rapid, but somewhat slower than in the foregoing seventh example, due to the absence of the halogen salt, and the lowering of the glycolic acid concentration, in this eighth example.

For comparative purposes, the isopropyl alcohol solution was treated in the laboratory, using hydrogen peroxide only, with no halogen salt and no glycolic acid. The isopropyl alcohol and hydrogen peroxide were present in the same proportions as in the above seventh example. Although oxidation did take place the oxidation was unacceptably slow when compared to the additional components described in seventh and eighth examples. Similarly, the isopropyl alcohol solution was treated in the laboratory using sodium percarbonate only, with the same unacceptably slow oxidation performance.

EXAMPLE 9

An exemplary embodiment of a solution and process of the present invention is illustrated by a ninth example where, in the laboratory, an aqueous solution containing 1 percent by weight light machine oil (specific gravity approximately 0.90) was first treated by adding a peroxygen, i.e. hydrogen peroxide such that the resulting solution was 10 percent by weight hydrogen peroxide. A pre-mixed combination of a halogen salt, i.e. sodium bromide with a carboxylic acid, i.e. glycolic acid, was then added such that the resulting solution was 1 percent by weight sodium bromide and 2 percent by weight glycolic acid. The light machine oil was fully and almost instantaneously oxidized after the pre-mixed sodium bromide and glycolic acid were added.

EXAMPLE 10

An exemplary embodiment of a solution and process of the present invention is illustrated by a tenth example where, in the laboratory, an aqueous solution containing 1 percent by weight light machine oil (specific gravity approximately 0.90) was first treated by adding a peroxygen, i.e. hydrogen peroxide such that the resulting solution was 10 percent by weight hydrogen peroxide. A pre-mixed combination of a halogen salt, i.e. sodium chloride with a carboxylic acid, i.e. glycolic acid, was then added such that the resulting solution was 1 percent by weight sodium chloride and 2 percent by weight glycolic acid. The light machine oil was only partially oxidized.

Since all concentrations and components were the same in the ninth and tenth examples, other than the substitution of sodium chloride for sodium bromide, it is clear that sodium chloride, albeit effective, is less preferable than sodium bromide.

EXAMPLE 11

An exemplary embodiment of a solution and process of the present invention is illustrated by an eleventh example where, in the laboratory, an aqueous solution containing 1 percent by weight light machine oil (specific gravity approximately 0.90) was first treated by adding sodium percarbonate such that the resulting solution was 15 percent by weight hydrogen peroxide. A pre-mixed combination of a halogen salt, i.e. sodium bromide with a carboxylic acid, i.e. glycolic acid, was then added such that the resulting solution was 1 percent by weight sodium bromide and 2 percent by weight glycolic acid. The light machine oil was fully and almost instantaneously oxidized after the pre-mixed sodium bromide and glycolic acid were added. This example repeats the conditions of the ninth example, except the peroxygen compound, i.e. hydrogen peroxide, is introduced through the addition of the sodium percarbonate. The ninth example and this example indicate the ability to choose between direct or indirect addition of hydrogen peroxide, without an untoward decline in oxidation efficiency.

EXAMPLE 12

A twelfth example is analogous to the tenth example. Conditions of the eleventh example are repeated other than the substitution of sodium chloride for sodium bromide. As discussed with regard to the tenth example, the sodium chloride is acceptable, but less than optimal when compared to sodium bromide.

EXAMPLE 13

An exemplary embodiment of a solution and process of the present invention is illustrated by a thirteenth example where, in the laboratory, an aqueous solution containing 1 percent by a baby oil, comprising a hydrocarbon based mineral oil (specific gravity approximately 0.90), was first treated by adding hydrogen peroxide such that the resulting solution was 5 percent by weight hydrogen peroxide. A pre-mixed combination of a halogen salt, i.e. sodium bromide with a carboxylic acid, i.e. glycolic acid, was then added such that the resulting solution was 0.5 percent by weight sodium bromide and 2 percent by weight glycolic acid. The baby oil was fully and almost instantaneously oxidized after the pre-mixed sodium bromide and glycolic acid were added.

EXAMPLE 14

An exemplary embodiment of a solution and process of the present invention is illustrated by a fourteenth example where, in the laboratory, an aqueous solution containing 1 percent by weight baby oil (specific gravity approximately 0.90) was first treated by adding sodium percarbonate such that the resulting solution was 5 percent by weight hydrogen peroxide. A pre-mixed combination of a halogen salt, i.e. sodium bromide with a carboxylic acid, i.e. glycolic acid, was then added such that the resulting solution was 0.5 percent by weight sodium bromide and 2 percent by weight glycolic acid. The baby oil was fully and almost instantaneously oxidized after the pre-mixed sodium bromide and glycolic acid were added. This example repeats the conditions of the thirteenth example, except the peroxygen compound, i.e. hydrogen peroxide, is introduced through the addition of the sodium percarbonate. The thirteenth example and this example again indicate the ability to choose between direct or indirect addition of hydrogen peroxide, without an untoward decline in oxidation efficiency.

EXAMPLE 15

An exemplary embodiment of a solution and process of the present invention is illustrated by a fifteenth example where, in the laboratory, an aqueous solution containing 1 percent by weight baby oil was first treated by adding sodium percarbonate such that the resulting solution was 5 percent by weight hydrogen peroxide. A carboxylic acid, i.e. glycolic acid, was then added such that the resulting solution was 2 percent by weight glycolic acid. The baby oil was partially oxidized after the glycolic acid was added. This example repeats the conditions of the fourteenth example, except that the halogen salt is omitted. The oxidation was rapid, but somewhat slower than in the foregoing fourteenth example, due to the absence of the halogen salt.

COMPARATIVE EXAMPLE A

For comparative purposes, the baby oil solution was treated in the laboratory, using sodium percarbonate and sodium bromide only, with no glycolic acid. The baby oil, sodium percarbonate and sodium bromide were present in the same proportions as in the above fourteenth example. Although partial oxidation did take place the oxidation was unacceptably slow when compared to the fourteenth example, which included the glycolic acid with the sodium bromide.

EXAMPLE 16

An exemplary embodiment of a solution and process of the present invention is illustrated by a sixteenth example where, in the laboratory, an aqueous solution containing 1 percent by weight baby oil (specific gravity approximately 0.90) was first treated by adding sodium percarbonate such that the resulting solution was 5 percent by weight hydrogen peroxide. A pre-mixed combination of a halogen salt, i.e. sodium chloride with a carboxylic acid, i.e. glycolic acid, was then added such that the resulting solution was 0.5 percent by weight sodium chloride and 2 percent by weight glycolic acid. The baby oil was only partially oxidized. Since all concentrations and components were the same in the fourteenth and sixteenth examples, other than the substitution of sodium chloride for sodium bromide, it is clear that sodium chloride, albeit effective, is less preferable than sodium bromide.

EXAMPLE 17

An exemplary embodiment of a solution and process of the present invention is illustrated by a seventeenth example where, in the laboratory, an aqueous solution containing 1 percent by weight of a phosphonic acid, i.e. HEDP (1-hydroxyethane-1, 1-diphosphonic acid) was first treated by adding sodium percarbonate such that the resulting solution was 10 percent by weight hydrogen peroxide. A pre-mixed combination of a halogen salt, i.e. sodium bromide with a carboxylic acid, i.e. glycolic acid, was then added such that the resulting solution was 0.5 percent by weight sodium bromide and 2 percent by weight glycolic acid. The HEDP was fully and almost instantaneously oxidized to phosphate, carbon dioxide and water, after the pre-mixed sodium bromide and glycolic acid were added.

EXAMPLE 18

An exemplary embodiment of a solution and process of the present invention is illustrated by an eighteenth example where, in the laboratory, an aqueous solution containing 1 percent by weight of a phosphonic acid, i.e. HEDP (1-hydroxyethane-1, 1-diphosphonic acid) was first treated by adding sodium percarbonate such that the resulting solution was 10 percent by weight hydrogen peroxide. A pre-mixed combination of a halogen salt, i.e. sodium chloride with a carboxylic acid, i.e. glycolic acid, was then added such that the resulting solution was 0.5 percent by weight sodium chloride and 2 percent by weight glycolic acid. The HEDP was partially oxidized to phosphate, carbon dioxide and water, after the pre-mixed sodium chloride and glycolic acid were added. Since all concentrations and components were the same in the seventeenth and eighteenth examples, other than the substitution of sodium chloride for sodium bromide, it is clear that sodium chloride, albeit effective, is less preferable than sodium bromide.

EXAMPLE 19

An exemplary embodiment of a solution and process of the present invention is illustrated by a nineteenth example where, in the laboratory, an aqueous solution containing 1 percent by weight of a phosphonic acid, i.e. HEDP (1-hydroxyethane-1, 1-diphosphonic acid) was first treated by adding sodium percarbonate such that the resulting solution was 10 percent by weight hydrogen peroxide. A pre-mixed combination of a halogen salt, i.e. sodium bromide with a carboxylic acid, i.e. acetic acid, was then added such that the resulting solution was 0.5 percent by weight sodium bromide and 2 percent by weight acetic acid. The HEDP was partially oxidized to phosphate, carbon dioxide and water, after the pre-mixed sodium bromide and acetic acid were added. Since all concentrations and components were the same in the seventeenth and nineteenth examples, other than the substitution of acetic acid for glycolic acid, it is clear that acetic acid, albeit effective, is less preferable than glycolic acid.

EXAMPLE 20

An exemplary embodiment of a solution and process of the present invention is illustrated by a twentieth example where, in the laboratory, an aqueous solution containing 1 percent by weight of a phosphonic acid, i.e. PBTC (2-phosphonobutane-1,2,4-tricarboxylic acid) was first treated by adding sodium percarbonate such that the resulting solution was 10 percent by weight hydrogen peroxide. A pre-mixed combination of a halogen salt, i.e. sodium bromide with a carboxylic acid, i.e. glycolic acid, was then added such that the resulting solution was 0.5 percent by weight sodium bromide and 2 percent by weight glycolic acid. The PBTC was partially oxidized to phosphate, carbon dioxide and water, after the pre-mixed sodium bromide and glycolic acid were added.

EXAMPLE 21

An exemplary embodiment of a solution and process of the present invention is illustrated by a twenty-first example where, in the laboratory, an aqueous solution containing 1 percent by weight of a phosphonic acid, i.e. PBTC (2-phosphonobutane-1,2,4-tricarboxylic acid) was first treated by adding sodium percarbonate such that the resulting solution was 5 percent by weight hydrogen peroxide. A pre-mixed combination of a halogen salt, i.e. sodium bromide with a carboxylic acid, i.e. glycolic acid, was then added such that the resulting solution was 0.5 percent by weight sodium bromide and 2 percent by weight glycolic acid. The PBTC was partially oxidized to phosphate, carbon dioxide and water, after the pre-mixed sodium bromide and glycolic acid were added, however, less oxidation occurred than in the twentieth example. Since all concentrations and components were the same in the twentieth and twenty-first examples, other than the reduced concentration of sodium percarbonate, it is clear that a change in the concentration of the peroxygen compound will have a corresponding change in the amount of oxidation.

EXAMPLE 22

An exemplary embodiment of a solution and process of the present invention is illustrated by a twenty-second example where, in the laboratory, an aqueous solution containing 1 percent by weight of a phosphonic acid, i.e. PBTC (2-phosphonobutane-1,2,4-tricarboxylic acid) was first treated by adding hydrogen peroxide such that the resulting solution was 10 percent by weight hydrogen peroxide. A pre-mixed combination of a halogen salt, i.e. sodium bromide with a carboxylic acid, i.e. glycolic acid, was then added such that the resulting solution was 0.5 percent by weight sodium bromide and 2 percent by weight glycolic acid. The PBTC was partially oxidized to phosphate, carbon dioxide and water, after the pre-mixed sodium bromide and glycolic acid were added. The twentieth example and this example again indicate the ability to choose between direct or indirect addition of hydrogen peroxide, without an untoward decline in oxidation efficiency.

EXAMPLE 23

An exemplary embodiment of a solution and process of the present invention is illustrated by a twenty-third example where, in the laboratory, an aqueous solution containing 1 percent by weight of a phosphonic acid, i.e. PBTC (2-phosphonobutane- 1,2,4-tricarboxylic acid) was first treated by adding hydrogen peroxide such that the resulting solution was 10 percent by weight hydrogen peroxide. A pre-mixed combination of a halogen salt, i.e. sodium chloride with a carboxylic acid, i.e. glycolic acid, was then added such that the resulting solution was 0.5 percent by weight sodium chloride and 2 percent by weight glycolic acid. The PBTC was partially oxidized to phosphate, carbon dioxide and water, after the pre-mixed sodium chloride and glycolic acid were added. The amount of oxidation was, however, less than that in the twentieth example which used sodium bromide. It is clear that sodium chloride, albeit effective, is less preferable than sodium bromide.

COMPARATIVE EXAMPLE B

For comparative purposes, the PBTC solution was treated in the laboratory, under the conditions of the twentieth example, except for the substitution of sulfamic acid for glycolic acid. Only negligible oxidation took place, providing a clear indication that non-carboxylic acids are unacceptable substitutes for the carboxylic acids used in the present invention. This remained true in an additional laboratory test wherein the concentrations of sodium bromide and sulfamic acid were at least doubled. The oxidation remained negligible and unacceptable.

The foregoing exemplary embodiments of the present invention that reference phosphonic acid has a slower oxidation rate than those exemplary embodiments involving hydrocarbons. However, because the presence of phosphonic acids as a contaminant is often hard to determine, the present invention is useful as an indicator of the presence of one or more of the phosphonic acids.

EXAMPLES 24–25

An exemplary embodiment of a solution and process of the present invention is illustrated by a twenty-fourth example where, in the laboratory, an aqueous solution containing 1 percent by weight baby oil (specific gravity approximately 0.90) was first treated by adding sodium percarbonate such that the resulting solution was 5 percent by weight hydrogen peroxide. A pre-mixed combination of a halogen compound, i.e. periodic acid with a carboxylic acid, i.e. glycolic acid, was then added such that the resulting solution was 0.5 percent by weight periodic acid and 2 percent by weight glycolic acid. The baby oil was only partially oxidized. Since all concentrations and components were the same in the fifteenth and twenty-fourth examples, other than the substitution of periodic acid for sodium bromide, it is clear that periodic acid, albeit effective, is less preferable than sodium bromide. Analogously, in another embodiment, illustrated by a twenty-fifth example, sodium fluoride was substituted for the sodium bromide, this example otherwise having the same conditions as the twenty-fourth example. The results were similar to the twenty-fourth example.

EXAMPLES 26–27

An exemplary embodiment of a solution and process of the present invention is illustrated by a twenty-sixth example where, in the laboratory, an aqueous solution containing 1 percent by weight baby oil (specific gravity approximately 0.90) was first treated by adding hydrogen peroxide such that the resulting solution was 5 percent by weight hydrogen peroxide. A pre-mixed combination of a halogen compound, i.e. periodic acid with a carboxylic acid, i.e. glycolic acid, was then added such that the resulting solution was 0.5 percent by weight periodic acid and 2 percent by weight glycolic acid. The baby oil was only partially oxidized. Since all concentrations and components were the same in the thirteenth and twenty-sixth examples, other than the substitution of periodic acid for sodium bromide, it is clear that periodic acid, albeit effective, is less preferable than sodium bromide. Analogously, in another embodiment, illustrated by a twenty-seventh example, sodium fluoride was substituted for the sodium bromide, this example otherwise having the same conditions as the twenty-sixth example. The results were similar to the twenty-sixth example.

EXAMPLE 28

An exemplary embodiment of a solution and process of the present invention is illustrated by a twenty-eighth example where, in the laboratory, an aqueous solution containing 1 percent by weight light machine oil (specific gravity approximately 0.90) was first treated by adding sodium percarbonate such that the resulting solution was 10 percent by weight hydrogen peroxide. A pre-mixed combination of a halogen salt, i.e. sodium iodide with a carboxylic acid, i.e. glycolic acid, was then added such that the resulting solution was 0.5 percent by weight sodium iodide and 1 percent by weight glycolic acid. The light machine oil was fully and almost instantaneously oxidized after the pre-mixed sodium iodide and glycolic acid were added.

EXAMPLE 29

An exemplary embodiment of a solution and process of the present invention is illustrated by a twenty-ninth example where, in the laboratory, an aqueous solution containing 1 percent by weight light machine oil (specific gravity approximately 0.90) was first treated by adding sodium percarbonate such that the resulting solution was 5 percent by weight hydrogen peroxide. A pre-mixed combination of a halogen salt, i.e. sodium bromide with a carboxylic acid, i.e. oxalic acid, was then added such that the resulting solution was 0.5 percent by weight sodium bromide and 1 percent by weight oxalic acid. The light machine oil was only partially oxidized after the pre-mixed sodium bromide and oxalic acid were added. It is clear that oxalic acid, albeit effective, is less preferable than glycolic acid.

EXAMPLE 30

An exemplary embodiment of a solution and process of the present invention is illustrated by a thirtieth example where, in the laboratory, an aqueous solution containing 1 percent by weight light machine oil (specific gravity approximately 0.90) was first treated by adding sodium percarbonate such that the resulting solution was 10 percent by weight hydrogen peroxide. A pre-mixed combination of a halogen salt, i.e. sodium bromide with a carboxylic acid, i.e. benzoic acid, was then added such that the resulting solution was 0.5 percent by weight sodium bromide and 1 percent by weight benzoic acid. The light machine oil was slowly but fully oxidized after the pre-mixed sodium bromide and benzoic acid were added. It is clear that benzoic acid, although effective, is less preferable than glycolic acid.

EXAMPLE 31

An exemplary embodiment of a solution and process of the present invention is illustrated by a thirty-first example where, in the laboratory, an aqueous solution containing 1 percent by weight light machine oil (specific gravity approximately 0.90) was first treated by adding sodium percarbonate such that the resulting solution was 10 percent by weight hydrogen peroxide. A pre-mixed combination of a halogen salt, i.e. sodium bromide with a carboxylic acid, i.e. formic acid, was then added such that the resulting solution was 0.5 percent by weight sodium bromide and 1 percent by weight formic acid. The light machine oil was slowly but fully oxidized after the pre-mixed sodium bromide and formic acid were added. It is clear that formic acid, although effective, is less preferable than glycolic acid

EXAMPLE 32

An exemplary embodiment of a solution and process of the present invention is illustrated by a thirty-second example where, in the laboratory, an aqueous solution containing 1 percent by weight light machine oil (specific gravity approximately 0.90) was first treated by adding calcium peroxide such that the resulting solution was 10 percent by weight calcium peroxide. A pre-mixed combination of a halogen salt, i.e. sodium bromide with a carboxylic acid, i.e. glycolic acid, was then added such that the resulting solution was 0.5 percent by weight sodium bromide and 1 percent by weight glycolic acid. The light machine oil was fully oxidized after the pre-mixed sodium bromide and glycolic acid were added. Although completely oxidized, the rate of oxidation using calcium peroxide was less satisfactory than that achieved using sodium percarbonate.

EXAMPLE 33

An exemplary embodiment of a solution and process of the present invention is illustrated by a thirty-third example where, in the laboratory, an aqueous solution containing 1 percent by weight light machine oil (specific gravity approximately 0.90) was first treated by adding magnesium peroxide such that the resulting solution was 10 percent by weight magnesium peroxide. A pre-mixed combination of a halogen salt, i.e. sodium bromide with a carboxylic acid, i.e. glycolic acid, was then added such that the resulting solution was 0.5 percent by weight sodium bromide and 1 percent by weight glycolic acid. The light machine oil was fully and almost instantaneously oxidized after the pre-mixed sodium bromide and glycolic acid were added.

EXAMPLE 34

An exemplary embodiment of a solution and process of the present invention is illustrated by a thirty-fourth example where, in the laboratory, an aqueous solution containing 1 percent by weight light machine oil (specific gravity approximately 0.90) was first treated by adding sodium perborate such that the resulting solution was 10 percent by weight sodium perborate. A pre-mixed combination of a halogen salt, i.e. sodium bromide with a carboxylic acid, i.e. glycolic acid, was then added such that the resulting solution was 0.5 percent by weight sodium bromide and 1 percent by weight glycolic acid. The light machine oil was fully and almost instantaneously oxidized after the pre-mixed sodium bromide and glycolic acid were added.

EXAMPLES 35–41

The circumstances of the above fourteenth example, formed the basis for an additional seven laboratory tests, the thirty-fifth through forty-first, wherein the solution was reduced to 3 percent by weight hydrogen peroxide, and the pre-mixed combinations of the sodium bromide and glycolic acid included combinations wherein the resulting solution was as low as 0.00005 percent sodium bromide and 0.0001 percent glycolic acid. In such tests, the baby oil was fully and almost instantaneously oxidized following the introduction of the pre-mixed sodium bromide and glycolic acid, until, in the fortieth test, the sodium bromide concentration was reduced to 0.0001 percent by weight and the glycolic acid concentration was reduced to 0.0002 percent by weight. At such concentrations the oxidation, in a short period of time, was only partial, and in the forty-first test, a relatively fast partial oxidation, and a significantly delayed, but almost complete, oxidation was achieved when the sodium bromide concentration was further reduced to 0.00005 percent by weight and the glycolic acid concentration was further reduced to 0.0001 percent by weight. In both the fortieth and forty-first tests, the partial oxidation was satisfactory, albeit less satisfactory than a complete oxidation.

Accordingly, a satisfactory oxidation performance is indicated for a benchmark concentration of 1 percent by weight baby oil in water, using solutions of the present invention having the peroxygen compound added in a concentration ranging from 3 percent by weight to 30 percent by weight, the carboxylic acid added in a concentration ranging from 0.0001 percent by weight (1 ppm) to 10 percent by weight, and the halogen compound added in a concentration ranging from 0.00005 percent by weight (0.5 ppm) to 10 percent by weight. The foregoing upper ranges reflect the development of an undesirable foamy paste as the relative amount of water is reduced.

EXAMPLE 42

An exemplary embodiment of a solution and process of the present invention is illustrated by a forty-second example where, in the laboratory, an aqueous solution containing 1 percent by weight ammonia (specific gravity approximately 1.0) was first treated by adding sodium percarbonate such that the resulting solution was 10 percent by weight hydrogen peroxide. A pre-mixed combination of a halogen salt, i.e. sodium bromide with a carboxylic acid, i.e. glycolic acid, was then added such that the resulting solution was 0.5 percent by weight sodium bromide and 1 percent by weight glycolic acid. The ammonia was fully and almost instantaneously oxidized after the pre-mixed sodium bromide and glycolic acid were added.

EXAMPLES 43–47

The circumstances of the foregoing forty-second example, formed the basis for an additional five laboratory tests, the forty-third through forty-seventh, wherein the solution was reduced to as low as 1 percent by weight hydrogen peroxide, and the pre-mixed combinations of the sodium bromide and glycolic acid included combinations wherein the resulting solution was as low as 0.1 percent sodium bromide and 0.1 percent glycolic acid. In such tests, the ammonia was fully and almost instantaneously oxidized following the introduction of the pre-mixed sodium bromide and glycolic acid, until the hydrogen peroxide concentration was reduced to 1 percent by weight, sodium bromide concentration was reduced to 0.1 percent by weight and the glycolic acid concentration was reduced to 0.1 percent by weight. At such concentrations the oxidation was partial. The partial oxidation was satisfactory, albeit less satisfactory than a complete oxidation.

Accordingly, a satisfactory oxidation performance is indicated for a benchmark concentration of 1 percent by weight ammonia in water, using solutions of the present invention having the peroxygen compound added in a concentration ranging from 1 percent by weight to 30 percent by weight, the carboxylic acid added in a concentration ranging from 0.1 percent by weight to 10 percent by weight, and the halogen compound added in a concentration ranging from 0.1 percent by weight to 10 percent by weight. The upper ranges reflect the development of an undesirable foamy paste as the relative amount of water is reduced.

EXAMPLE 48

An exemplary embodiment of a solution and process of the present invention is illustrated by a forty-eighth example where, in the laboratory, light machine oil (specific gravity approximately 0.90) was introduced to an aqueous solution containing 10 percent by weight hydrogen peroxide, 0.5 percent by weight sodium bromide, and 1 percent by weight glycolic acid. The light machine oil was fully and almost instantaneously oxidized. From this example it is clear that a pre-mixed solution of a peroxygen compound with a carboxylic acid and a halogen compound is effective for oxidizing contaminants.

Prospectively, the pre-mixed solution of the exemplary embodiment of the forty-eighth example can be used to oxidize contaminants, such as hydrocarbon, on fresh water subsurface geologic formations. In such a case the subsurface formation is typically in fluid communication with the surface through a well bore which can be used as an injection route for the solution. The contaminated subsurface is exposed to the solution as the solution is injected through the well bore.

All the foregoing examples were conducted at approximately 1 atm, and without the addition of heat beyond ordinary room temperature or existing outdoor conditions. In such examples, pH ranged from 1–12, and the effectiveness of various solutions was not noticeably pH sensitive.

With respect to the above description then, it is to be realized that the optimum solutions and processes for a particular contaminated media or surface will include chemical, operational facility, and equipment implementations or changes, which will occur to those skilled in the art upon review of the present disclosure.

All equivalent relationships to those illustrated in the drawings and described in the specification are intended to be encompassed by the present invention.

The descriptions in this specification are for purposes of illustration only and are not to be construed in a limiting sense. The scope of the present invention is limited only by the language of the following claims.

I claim:

1. A process for oxidizing hydrocarbon contaminants in a media comprising exposing the hydrocarbon contaminants to an aqueous solution comprising a peroxygen compound and a carboxylic acid, wherein the carboxylic acid is selected from the group consisting of glycolic acid, oxalic acid, formic acid, and benzoic acid.

2. The process of claim 1, wherein the media is selected from a group consisting of soil, sludge, and water.

3. The process of claim 1, wherein the aqueous solution further comprises a halogen compound.

4. The process of claim 1, wherein the halogen compound is selected from the group consisting of sodium bromide, sodium chloride, sodium flouride, sodium iodide, and periodic acid.

5. The process of claim 3, wherein the peroxygen compound is hydrogen peroxide, the carboxylic acid is glycolic acid, and the halogen compound is sodium bromide, and further wherein the media is water and the hydrocarbon contaminant is approximately 1 percent by weight, the hydrogen peroxide is from approximately 3 to 30 percent by weight, the glycolic acid is from approximately 0.0001 to 10 percent by weight, and the sodium bromide is from approximately 0.00005 to 10 percent by weight.

6. The process of claim 5, wherein sodium percarbonate is the source of the hydrogen peroxide.

7. The process of claim 3, wherein the peroxygen compound is hydrogen peroxide, the carboxylic acid is glycolic acid, and the halogen compound is sodium bromide.

8. The process of claim 1, wherein the peroxygen compound is selected from the group consisting of hydrogen peroxide, calcium peroxide, magnesium peroxide, and sodium perborate.

9. The process of claim 8, wherein the aqueous solution further comprises a halogen compound selected from the group consisting of sodium bromide, sodium chloride, sodium flouride, sodium iodide, and periodic acid.

10. The process of claim 1, wherein exposing the hydrocarbon contaminants to an aqueous solution further comprises exposing the hydrocarbon contaminants to the aqueous solution by mixing the aqueous solution with the media.

11. A process for oxidizing hydrocarbon contaminants in a media comprising:
 exposing at least some of the hydrocarbon contaminants to a peroxygen compound; and
 then exposing the remaining hydrocarbon contaminants to an aqueous solution comprising a carboxylic acid.

12. The process of claim 11, wherein the media is selected from a group consisting of soil, sludge, and water.

13. The process of claim 11, wherein the aqueous solution further comprises a halogen compound.

14. The process of claim 13, wherein the halogen compound is selected from the group consisting of sodium bromide, sodium chloride, sodium flouride, sodium iodide, and periodic acid.

15. The process of claim 13, wherein the peroxygen compound is hydrogen peroxide, the carboxylic acid is glycolic acid, and the halogen compound is sodium bromide, and further wherein the media is water and the hydrocarbon contaminant is approximately 1 percent by weight, the hydrogen peroxide is from approximately 3 to 30 percent by weight, the glycolic acid is from approximately 0.0001 to 10 percent by weight, and the sodium bromide is from approximately 0.00005 to 10 percent by weight.

16. The process of claim 15, wherein sodium percarbonate is the source of the hydrogen peroxide.

17. The process of claim 13, wherein the peroxygen compound is hydrogen peroxide, the carboxylic acid is glycolic acid, and the halogen compound is sodium iodide.

18. The process of claim 11, wherein the carboxylic acid is selected from the group consisting of glycolic acid, oxalic acid, acetic acid, formic acid, and benzoic acid.

19. The process of claim 11, wherein the peroxygen compound is selected from the group consisting of hydrogen peroxide, calcium peroxide, magnesium peroxide, and sodium perborate.

20. The process of claim 19, wherein the carboxylic acid is selected from the group consisting of glycolic acid, oxalic acid, acetic acid, formic acid, and benzoic acid.

21. The process of claim 20, wherein the aqueous solution further comprises a halogen compound selected from the group consisting of sodium bromide, sodium chloride, sodium flouride, sodium iodide, and periodic acid.

22. The process of claim 11, wherein: the step of exposing at least some of the hydrocarbon contaminants to a peroxygen compound, further comprises exposing at least some of the hydrocarbon contaminants to the peroxygen compound by mixing the peroxygen compound with the media; and the step of exposing the remaining hydrocarbon contaminants to a carboxylic acid, further comprises exposing the remaining hydrocarbon contaminants to a carboxylic acid by mixing the carboxylic acid with the media.

23. A process for oxidizing phosphonic acid contaminants in a media comprising:
exposing at least some of the phosphonic acid contaminants to a peroxygen compound; and
exposing the remaining phosphonic acid contaminants to an aqueous solution comprising a carboxylic acid.

24. The process of claim 23, wherein the media is selected from a group consisting of soil, sludge, and water.

25. The process of claim 23, wherein the aqueous solution further comprises a halogen compound.

26. The process of claim 25, wherein the halogen compound is selected from the group consisting of sodium bromide, sodium chloride, sodium flouride, sodium iodide, and periodic acid.

27. The process of claim 25, wherein the peroxygen compound is hydrogen peroxide, the carboxylic acid is glycolic acid, and the halogen compound is sodium bromide.

28. The process of claim 27, wherein sodium percarbonate is the source of the hydrogen peroxide.

29. The process of claim 25, wherein the peroxygen compound is hydrogen peroxide, the carboxylic acid is glycolic acid, and the halogen compound is sodium iodide.

30. The process of claim 23, wherein the carboxylic acid is selected from the group consisting of glycolic acid, oxalic acid, acetic acid, formic acid, and benzoic acid.

31. The process of claim 23, wherein the peroxygen compound is selected from the group consisting of hydrogen peroxide, calcium peroxide, magnesium peroxide, and sodium perborate.

32. The process of claim 31, wherein the carboxylic acid is selected from the group consisting of glycolic acid, oxalic acid, acetic acid, formic acid, and benzoic acid.

33. The process of claim 32, wherein the aqueous solution further comprises a halogen compound selected from the group consisting of sodium bromide, sodium chloride, sodium flouride, sodium iodide, and periodic acid.

34. The process of claim 23, wherein: the step of exposing at least some of the phosphonic acid contaminants to a peroxygen compound, further comprises exposing at least some of the phosphonic acid contaminants to the peroxygen compound by mixing the peroxygen compound with the media; and the step of exposing the remaining phosphonic acid contaminants to a carboxylic acid, further comprises exposing the remaining phosphonic acid contaminants to a carboxylic acid by mixing the carboxylic acid with the media.

35. A process for oxidizing contaminants on a solid surface, wherein the solid surface is selected from the group consisting of brick, concrete, cement, asphalt, clay, and caliche, the process comprising:
wetting the solid surface with water;
distributing a peroxygen compound onto the surface; and
distributing an aqueous carboxylic acid solution onto the surface.

36. The process of claim 35, wherein the contaminant is selected from the group consisting of arabic gum, hydrocarbon, animal oil, and vegetable oil.

37. The process of claim 35, wherein the aqueous carboxylic acid solution further comprises a halogen compound.

38. The process of claim 37, wherein the peroxygen compound is hydrogen peroxide, the carboxylic acid is glycolic acid, and the halogen compound is sodium bromide.

39. The process of claim 38, wherein sodium percarbonate is the source of the hydrogen peroxide.

40. A process for oxidizing organic compound contaminants in a media, wherein the organic compound is selected from the group consisting of animal oils and vegetable oils, the process comprising:
exposing at least some of the organic compound contaminants to a peroxygen compound; and
then exposing the remaining organic compound contaminants to an aqueous solution comprising a carboxylic acid.

41. The process of claim 40, wherein the media is selected from a group consisting of soil, sludge, and water.

42. The process of claim 40, wherein the aqueous solution further comprises a halogen compound.

43. The process of claim 42, wherein the halogen compound is selected from the group consisting of sodium bromide, sodium chloride, sodium flouride, sodium iodide, and periodic acid.

44. The process of claim 42, wherein the peroxygen compound is hydrogen peroxide, the carboxylic acid is glycolic acid, and the halogen compound is sodium bromide.

45. The process of claim 44, wherein sodium percarbonate is the source of the hydrogen peroxide.

46. The process of claim 42, wherein the peroxygen compound is hydrogen peroxide, the carboxylic acid is glycolic acid, and the halogen compound is sodium iodide.

47. The process of claim 40, wherein the carboxylic acid is selected from the group consisting of glycolic acid, oxalic acid, acetic acid, formic acid, and benzoic acid.

48. The process of claim 40, wherein the peroxygen compound is selected from the group consisting of hydrogen peroxide, calcium peroxide, magnesium peroxide, and sodium perborate.

49. The process of claim 48, wherein the carboxylic acid is selected from the group consisting of glycolic acid, oxalic acid, acetic acid, formic acid, and benzoic acid.

50. The process of claim 49, wherein the aqueous solution further comprises a halogen compound selected from the group consisting of sodium bromide, sodium chloride, sodium flouride, sodium iodide, and periodic acid.

51. A process for oxidizing a layer of contaminated sludge underlying a layer of water, comprising:
distributing a peroxygen compound into the water; and
distributing a carboxylic acid into the water.

52. The process of claim 51, wherein the step of distributing a carboxylic acid into the water further comprises distributing a solution into the water having the carboxylic acid and a halogen compound.

53. The process of claim 52, wherein the peroxygen compound is hydrogen peroxide, the carboxylic acid is glycolic acid, and the halogen compound is sodium bromide.

54. A process for oxidizing bacteria suspended in wastewater, comprising:
exposing at least some of the bacteria to a peroxygen compound by mixing the peroxygen compound with the wastewater; and
exposing the remaining bacteria to an aqueous solution comprising a carboxylic acid by mixing the aqueous solution with the wastewater: wherein the aqueous solution further comprises a halogen compound.

55. The process of claim 54, wherein the halogen compound is selected from the group consisting of sodium bromide, sodium chloride, sodium flouride, sodium iodide, and periodic acid.

56. The process of claim 54, wherein the peroxygen compound is hydrogen peroxide, the carboxylic acid is glycolic acid, and the halogen compound is sodium bromide.

57. The process of claim 56, wherein sodium percarbonate is the source of the hydrogen peroxide.

58. The process of claim 54, wherein the peroxygen compound is hydrogen peroxide, the carboxylic acid is glycolic acid, and the halogen compound is sodium iodide.

59. The process of claim 54, wherein the carboxylic acid is selected from the group consisting of glycolic acid, oxalic acid, acetic acid, formic acid, and benzoic acid.

60. The process of claim 54, wherein the peroxygen compound is selected from the group consisting of hydrogen peroxide, calcium peroxide, magnesium peroxide, and sodium perborate.

61. The process of claim 60, wherein the carboxylic acid is selected from the group consisting of glycolic acid, oxalic acid, acetic acid, formic acid, and benzoic acid.

62. The process of claim 61, wherein the aqueous solution further comprises a halogen compound selected from the group consisting of sodium bromide, sodium chloride, sodium flouride, sodium iodide, and periodic acid.

63. A process for oxidizing hydrocarbon contaminants in a subsurface formation, wherein the subsurface formation is in communication with the surface through a welt bore, comprising:
exposing the hydrocarbon contaminants to an aqueous solution comprising a peroxygen compound and a carboxylic acid, by injecting the solution through the well bore to the subsurface formation;
wherein the carboxylic acid is selected from the group consisting of glycolic acid, oxalic acid, formic acid, and benzoic acid.

64. The process of claim 63, wherein the aqueous solution further comprises a halogen compound.

65. The process of claim 64, wherein the peroxygen compound is hydrogen peroxide, the carboxylic acid is glycolic acid, and the halogen compound is sodium bromide.

66. A process for oxidizing hydrocarbon contaminants in a media comprising exposing the hydrocarbon contaminants to an aqueous solution comprising a peroxygen compound and a carboxylic acid, wherein the aqueous solution further comprises a halogen compound.

67. A process for oxidizing hydrocarbon contaminants in a media comprising:
exposing at least some of the hydrocarbon contaminants to a peroxygen compound; and
exposing the remaining hydrocarbon contaminants to an aqueous solution comprising a carboxylic acid;
wherein the aqueous solution further comprises a halogen compound.

68. A process for oxidizing organic compound contaminants in a media, wherein the organic compound is selected from the group consisting of animal oils and vegetable oils, the process comprising:
exposing at least some of the organic compound contaminants to a peroxygen compound; and
exposing the remaining organic compound contaminants to an aqueous solution comprising a carboxylic acid;
wherein the aqueous solution further comprises a halogen compound.

69. A process for oxidizing contaminated sludge underlying water, comprising:
distributing a peroxygen compound into the water; and
distributing a carboxylic acid into the water; and further wherein the step of distributing a carboxylic acid into the water further comprises distributing a solution into the water having the carboxylic acid and a halogen compound.

70. A process for oxidizing hydrocarbon contaminants in a subsurface formation, wherein the subsurface formation is in communication with the surface through a well bore, comprising:
exposing the hydrocarbon contaminants to an aqueous solution comprising a peroxygen compound and a carboxylic acid, by injecting the solution through the well bore to the subsurface formation;
wherein the aqueous solution further comprises a halogen compound.

* * * * *